United States Patent [19]
Seele
[11] Patent Number: 4,950,346
[45] Date of Patent: Aug. 21, 1990

[54] METHOD OF FORMING AN ADAPTOR FITTING AROUND A WORKPIECE

[76] Inventor: Harold A. Seele, 6636 Sherbourne Dr., Los Angeles, Calif. 90056

[21] Appl. No.: 310,344

[22] Filed: Feb. 14, 1989

Related U.S. Application Data

[62] Division of Ser. No. 7,156,415, Feb. 16, 1988, Pat. No. 4,872,655.

[51] Int. Cl.$^5$ .......... B29C 39/10

[52] U.S. Cl. .......... 156/245; 156/279; 156/289; 51/216 R; 51/217 R; 51/295; 51/297; 51/298; 269/130; 269/131; 269/132; 269/265; 269/275

[58] Field of Search .......... 156/245, 279, 289; 264/220, 225, 226; 269/130, 265, 266, 271, 275, 287, 288, 131, 132; 51/216 R, 217 R, 217 P, 217 T, 241 S, 259, 260, 261, 295, 297, 298, DIG. 15

[56] References Cited

U.S. PATENT DOCUMENTS

| | | | |
|---|---|---|---|
| 2,454,910 | 11/1948 | Carr | 51/295 |
| 3,318,594 | 5/1967 | Weiser | 269/265 |
| 3,377,411 | 4/1968 | Charvat | 51/298 |
| 3,449,008 | 6/1969 | Colechia | 269/275 |
| 3,539,671 | 11/1970 | Nauta | 264/226 |

*Primary Examiner*—Caleb Weston
*Attorney, Agent, or Firm*—Henry M. Bissell

[57] ABSTRACT

An apparatus and method are disclosed for holding a generally cylindrical workpiece for honing or otherwise machining an internal bore. The workpiece is held by a gripping surface over most of the innermost turn of a spirally wound spring and coil. The workpiece is grasped circumferentially over its outer surface without excess contact pressure at any particular point. A tendency of the machining operation to rotate the workpiece serves to secure the workpiece more tightly in position by tightening the outer turns of the spring band coil. A rotatable tensioning member acts under the influence of a biasing spring to decrease the diameter of the innermost turn of the spring band coil to bring the gripping surface into contact with the workpiece. A method for adapting the work-holding apparatus to smaller or irregularly shaped workpieces consists of molding an annular piece around the workpiece. The molded annular piece has an adhesive layer impregnated with an abrasive grit to grip the outer circumference of the workpiece. An alternative embodiment of the apparatus comprises an annular housing into which a removable cartridge holding a spring band coil can be inserted and fixed in position. A series of cartridges, each employing a different size of spring band coil, provides a work-holding apparatus that can be used with a wide range of workpiece diameters.

4 Claims, 2 Drawing Sheets

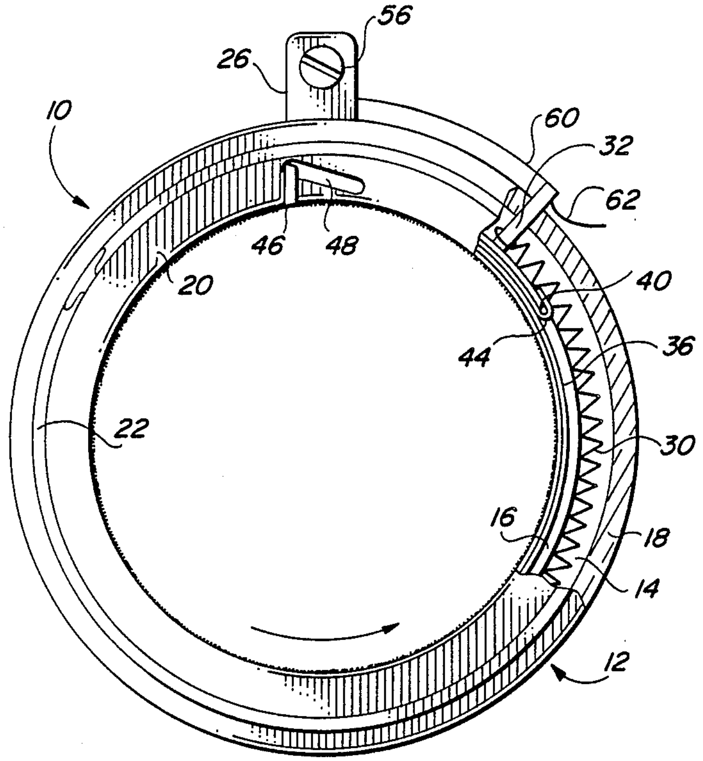
FIG. 1
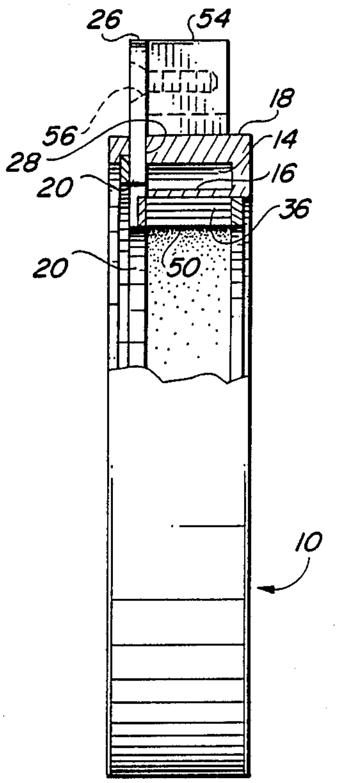
FIG. 2
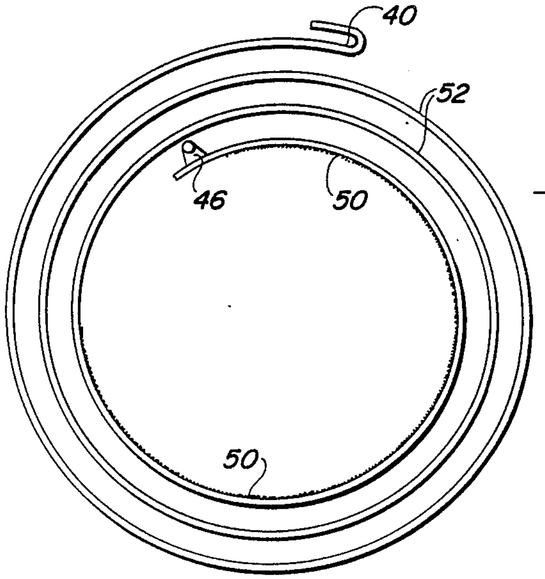
FIG. 3
FIG. 8
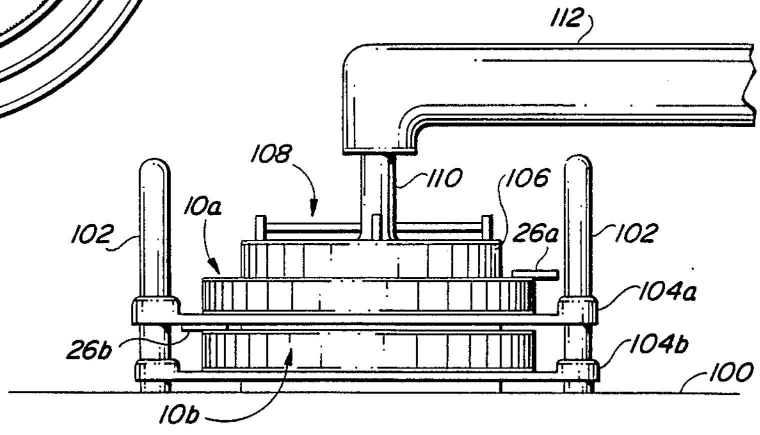

FIG. 4
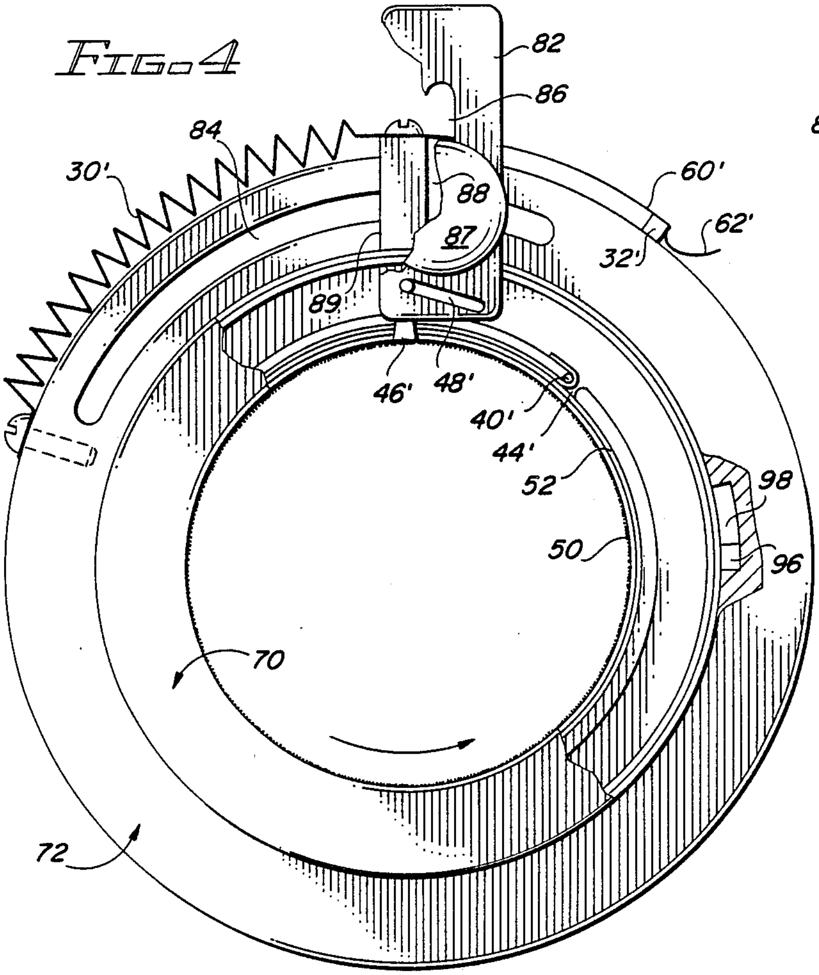
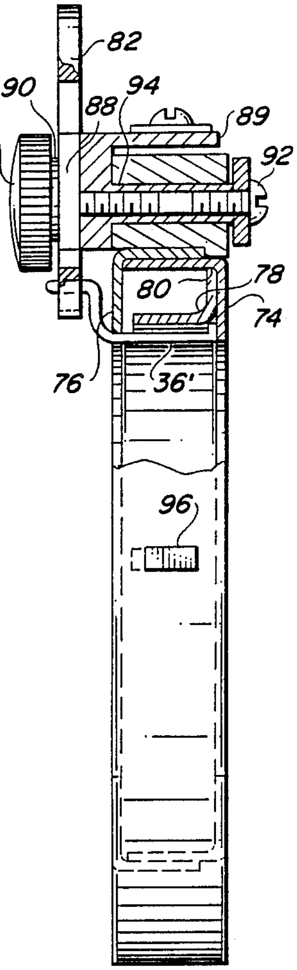
FIG. 5
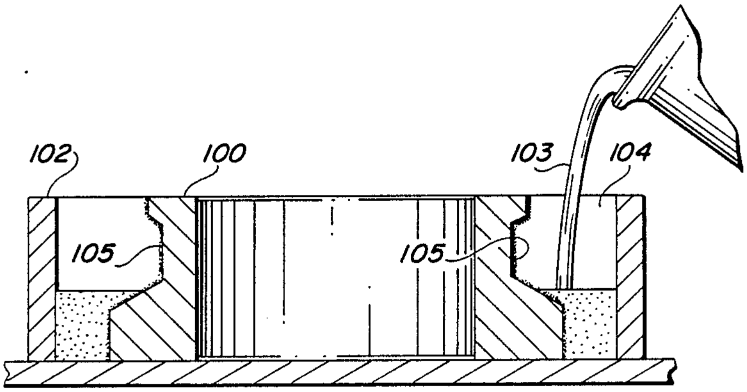
FIG. 6
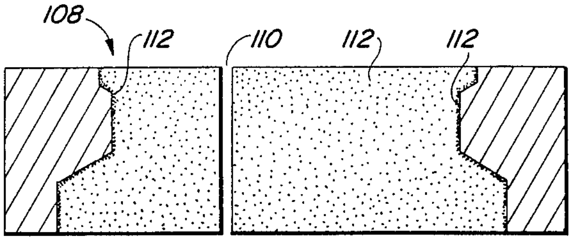
FIG. 7

METHOD OF FORMING AN ADAPTOR FITTING AROUND A WORKPIECE

This is a division of application Ser. No. 07/156,415, filed Feb. 16, 1988 now Pat. No. 4,872,655.

BACKGROUND OF THE INVENTION

1. Field of the Invention

This invention principally relates to work-holding apparatus and methods and, more particularly, to an apparatus and method for holding a workpiece having an internal bore so that the surface of the bore can be honed or otherwise machined.

2. Description of the Related Art

Conventional lathe chucks are not well adapted for holding a large object having an internal bore which requires honing, polishing, or various types of machining. Besides the very large size of a chuck needed to hold even a moderately sized cylindrical shell, for example, the jaws of the chuck bear down on just a few points of the workpiece, which tend to deform the shell. Large workpieces are commonly held by hand in order to perform honing operations on the interior surface of a bore in the workpiece. The lack of stability and the development of operator fatigue in such an approach are obvious, and the chance of marring the surface being worked on or of otherwise producing an unsatisfactory result clearly exists. In addition, holding a workpiece by hand against rotating machinery is an inherently risky procedure from the standpoint of operator safety.

It would be a great boon in machine shop practice if there existed a means for holding a workpiece for honing or otherwise machining the inside of a bore in the object without damaging the outer surface of the object, while providing sufficient holding strength and stability. Such a work-holding apparatus would be even more valuable if it were convenient to use, easy to install in a working position, economical to manufacture, and simple to service. It would also be advantageous if such a work-holding means had the capability of gripping a deformable object over its entire outer circumference without distorting its shape because of contact forces concentrated at just a few points.

SUMMARY OF THE INVENTION

The present invention incorporates all of the hoped-for advantages listed above in an apparatus and method for holding a generally cylindrical workpiece for honing or otherwise machining an internal bore. The workpiece is held by the innermost turn of a spirally wound spring band coil. The innermost turn has a gripping surface which grasps the workpiece circumferentially over its outer surface without excess contact pressure at any particular point. The tendency of the machining operation to rotate the workpiece serves to secure the workpiece more tightly in position. The holding apparatus is kept in its most open position, suitable for accepting a workpiece, against the force of a biasing spring. A rotatable tensioning member acting under the influence of the biasing spring serves to decrease the diameter of the innermost turn of the spring band coil to bring the gripping surface into contact with the workpiece and thereby hold it. The inner surface of the first or innermost turn of the spring coil is provided with an aggressive frictional coating or roughened surface, e.g., aluminum oxide adhesively affixed thereto, whereas the remaining surfaces of the spring coils, both inner and outer, which bear against each other are provided with smooth bearing surfaces, preferably lubricated, so that the bands can easily slip relative to each other. The terminal end of the outermost turn is anchored against rotation. Thus, as the first turn of the coil grips the workpiece, incurring an applied torque therefrom, it successively tightens the turns of the coil until all slack is taken up and the innermost turn firmly engages the workpiece.

The spring band coil and rotatable tensioning member are contained in an annular housing. The outer end of the spring band coil is attached to the housing, and the inner end has a hook-like extension which moves in a slot in the tensioning member inclined radially outward. When the tensioning member rotates in the housing because of the tension in the biasing spring, the inner end of the spring band coil is constrained to move inward toward the center of the coil. A spring band tab can be fixed to a pin on the housing to hold the spring coil open so a workpiece can be inserted in the apparatus in preparation for use.

As indicated, the annular housing is firmly gripped against rotation by a jig or chuck associated with the honing assembly which also supports the hone in a rigidly mounted position on a fixed center. In such an arrangement where the honing operation is being performed on large diameter, relatively short parts, there is a possibility of the part moving laterally to a limited extent under the torque applied by the tightening of the spring band coil. In such a case, it is desirable to restrain the part to prevent uneven wear by the hone. This is accomplished by the use of two or more of the work holding implements of the present invention in a stacked array with one being oriented approximately 180° relative to the other one. With such an arrangement, the lateral forces applied to the work by the spring band coils are balanced such that the part is held in a neutral position so that the honing can be equalized about the surface of the bore.

A method for adapting the work-holding apparatus to smaller or irregularly shaped workpieces consists of molding an annular piece around the workpiece. The molded annular piece has an adhesive layer impregnated with an abrasive grit along its inner surface to grip the outer circumference of the workpiece. Use of the adaptor forming method allows a wider range of workpiece diameters to be accommodated by the work-holding apparatus. The same method can be used to provide an adaptor for holding irregularly shaped workpieces. The irregularly shaped workpiece is placed in the center of an annular mold and casting material is poured into the space between the mold and the workpiece to produce a re-usable casting which has an outer diameter that can be accommodated by the work-holding apparatus of the invention. The adaptor casting can have one or more cuts in it to facilitate application to a workpiece prior to its insertion in the work-holding apparatus.

An alternative embodiment of the apparatus comprises an annular housing into which a removable cartridge holding the spring band coil can be inserted and fixed in position. A series of cartridges, each employing a different size of spring band coil and different inner diameter, provides a work-holding apparatus that can be used with a wide range of workpiece diameters.

BRIEF DESCRIPTION OF THE DRAWING

A better understanding of the present invention may be realized from a consideration of the following detailed description, taken in conjunction with the accompanying drawing in which:

FIG. 1 is a side elevational view, partially broken away, of one particular embodiment of the present invention;

FIG. 2 is an end elevational view, partially broken away, of the embodiment of FIG. 1;

FIG. 3 is a side elevational view of the spirally wound spring band utilized in the present invention;

FIG. 4 is a side elevational view, partially broken away, of an alternative embodiment of the work-holding apparatus;

FIG. 5 is a side elevational view, partly in section, of the alternative embodiment of FIG. 4;

FIG. 6 shows an annular mold with an irregularly shaped workpiece placed in it;

FIG. 7 shows an adaptor piece after removal from the mold of FIG. 6 in which it was formed; and FIG. 8 is a schematic representation of a pair of work holders stacked together to hold a workpiece.

DESCRIPTION OF THE PREFERRED EMBODIMENTS

In accordance with the present invention, a work-holding apparatus 10 is shown in elevational views, partly broken away, in FIGS. 1 and 2. An annular housing 12 has a circumferential channel 14 between an inner wall 16 and an outer wall 18. The height of wall 16 above the floor of channel 14 is less than that of wall 18, defining a shelf on which a rotatable annular plate or ring member 20 rests inside housing 12. A retaining member 22 consisting of an incomplete ring of spring steel holds annular member 20 in place by expanding into a shallow groove in the interior of wall 18. Annular member 20 has a projecting tab 26 which slides back and forth in a circumferential slot 28 over a portion of outer wall 18. A biasing spring 30 is attached at one end to a first pin 32 which spans the interior of channel 14. The other end of biasing spring 30 is attached to a second pin (not shown) which projects downward into channel 14 from annular member 20. Biasing spring 30 occupies a segment of the circumference of channel 14. A spirally wound spring band coil 36 occupies a shallow channel formed between an inner edge of housing 12 and rotatable annular member 20.

As shown in FIG. 3, which is a side elevational view of the spirally wound spring band coil 36, the outer end of coil 36 is bent into a narrow U-shape 40. The bent portion 40 fits in a narrow slot 44 in inner wall 16 of annular housing 12. U-shaped portion 40 fits around a part of the wall 16 adjacent slot 44, as shown in FIG. 1. At the other end of spring band coil 36 is a hook-shaped activator 46, a downwardly projecting portion of which moves back and forth as well as radially inward and outward in an inclined cam slot 48 in rotatable annular member 20.

Most of an innermost turn of coil 36 has a gripping surface 50 facing inward toward the center of the coil. The gripping surface 50 may comprise a hard sharp grit affixed to the inwardly facing surface of the innermost turn of coil 36 to provide the gripping surface. This may, for example, be in the form of aluminum oxide particles held in an adhesive layer. An alternative gripping surface 50 may be provided by the plating of a layer on the inwardly facing surface of the innermost turn of coil 36 with diamond or other abrasive dust embedded in the plating. This is a known technique and the methods for developing such a plated layer with embedded abrasive therein are well known in the prior art. Turns 52 outside the innermost turn have smooth bearing surfaces to permit the coil 36 to tighten around the part being gripped as torque is applied.

A means of fixing the position of rotatable annular member 20 with respect to annular housing 12 comprises a small block 54 drilled and tapped to receive a screw 56 which passes through a countersunk hole in tab 26. A spring band tab 60 is attached at one end to a side of block 54 closest to annular housing 12 and has a hole in a curved portion 62 to engage the end of pin 32 extending beyond wall 18. When curved portion 62 of tab 60 is fastened on the end of pin 32, the innermost turn of spring band coil 36 is opened to the maximum. Closure of the innermost turn of coil 36 to grip a workpiece is initiated by lifting curved portion 62 of tab 60 off pin 32; annular member 20 rotates counterclockwise, indicated by the arrow in FIG. 1, with respect to housing 12 in response to the force exerted by biasing spring 30. This initiates gripping of a workpiece in two aspects: (1) rotation of the ring 20, relative to the spiral spring coil 36, at the outset drives the tab 46 inwardly through the action of the cam slot 48, thus initiating contact of the innermost turn of the coil 36 with the workpiece; and (2) as the ring 20 continues to rotate, the end of the cam slot 48 picks up the tab 46 and draws the innermost turn of the coil 36 with frictional surface 50 into a gripping contact around the workpiece, thereby drawing successive turns of the coil 36 in tension until all of the slack is taken up against the hooked end 40 in housing wall slot 44.

Work-holding apparatus 10 is used to hold a workpiece in the following manner. The coil 36 is held in open position by fixing annular member 20 to annular housing 12. This is done by inserting pin 32 through the hole in spring band tab 60. The workpiece is inserted into the central space enclosed by spring band coil 36. After spring band tab 60 is lifted off pin 32, annular member 20 is rotated by the tension in biasing spring 30 to decrease the innermost turn of spring band coil 36 until gripping surface 50 is in contact with the outer periphery of the workpiece, as described. Since the gripping surface 50 of spring band coil 36 holds the workpiece over most if not all of its outer circumference, there is no concentration of stress on the workpiece at just a few points. Fragile workpieces can be held securely without altering their shape either temporarily or permanently.

An alternative embodiment of work-holding aparatus 10 is depicted in FIGS. 4 and 5. The principles of operation are the same as described above, but certain details of construction have been changed to provide greater convenience and economy. Parts that are subject to wear, or that require substitution in order to accommodate different sized workpieces, are combined in a replaceable cartridge unit 70 placed inside an annular case 72 to provide a complete operational equivalent of the embodiment described above.

Cartridge 70 comprises an inner flanged annulus 74 and an outer flanged annulus 76 which are press-fitted together. A third flange annulus having a more rounded transition between the annulus and the flange than in the case of 74 and 76 is spot welded inside flanged annulus 74 before it is inserted into flanged annulus 76. Spring band coil 36' fits inside cartridge 70. The width of flange 80 on flanged annulus 78 is chosen to accommodate the desired size of spring band coil 36' which in turn is adapted to a particular range of workpiece sizes. The U-shaped innermost end 40' of spring band coil 36' is secured to flanged annulus 78 by means of a narrow slot 44'. An activator 46' is attached to the innermost end of spring band coil 36' and moves in an inclined cam slot 48' in a tensioning member 82. Tensioning member 82 is constrained to move along a circular arc defined by circumferential slot 84 in case 72. Biasing spring 30' is attached at one end to case 72 and at another end to tensioning member 82. A spring band tab 60' with a curved end portion 62' having a hole in it is attached to tensioning member 82. When spring band tab 60' is secured over pin 64', spring band coil 36' has its widest aperture to allow insertion or removal of a workpiece.

The member 82 has a slot 86 in which key member 88 of a slide member 89 resides. Member 82 is held tightly against the slide member 89 when knob 87 is tightened so that shoulder 90 is brought to bear against member 82 which in turn bears on slide member 89. Flanged screw 92 is threaded into an internally threaded extension 94 of slide member 89 so that slide member 89 is free to move with slotted member 82 along the arc defined by slot 84. When knob 87 is loosened, the tensioning member 82 can be moved radially inward or outward with respect to slide member 89 to accommodate different sizes of cartridges 70 with spring band coils 36'.

A rectangular projection 96 on cartridge 70 fits into an L-shaped slot 98 in case 72 to effect a bayonet-type locking arrangement.

A method for producing an adaptor that fits around an irregularly shaped workpiece is illustrated by FIGS. 6 and 7. As shown in FIG. 6, an irregularly shaped workpiece 100 (shown in section as a collar) is placed in the center of an annular mold 102 and a casting material 103 is poured into the space 104 between the mold and the workpiece to produce a reusable casting which has an outer diameter that can be accommodated by the work-holding apparatus of the invention. Before the casting material is poured into the mold, the outer surface 105 of workpiece 100 is coated with a release agent followed by a layer of adhesive impregnated with an abrasive grit. Alternatively, the abrasive grit may be deposited on an already applied layer of adhesive by using a sandblast gun. The casting material is then poured into the mold and allowed to harden.

FIG. 7 is a sectional view of the cast collar 108 which is formed of the casting material 103 in the method shown in FIG. 6. The collar preferably has at least one slit 110 to permit removal of the cast collar 108 from the workpiece 100. It will be understood that the 108 is sufficiently flexible and slightly resilient so that it can be opened from around the workpiece 100 and, because of the slight amount of material removed in the slit 110, will be effective in tightly gripping the workpiece 100 when the work-holding apparatus of either of the above-described embodiments of the invention is placed around the outer periphery of the collar 108 so that the spring band coil 36 grips and tightens about the outer surface of the collar 108. The slit 110 and the resilience of the material 103 permit the collar 108 to tighten about the workpiece 100. The frictional engagement is enhanced by the abrasive grit 112 which transfers to the inner surface of the collar 108 from the outer surface 105 of workpiece 100 during the casting process. The abrasive grit 112 becomes embedded in the casting material 103 along the inner surface of the collar 108.

FIG. 8 is a schematic view showing the way in which a plurality of work holders may be used to maintain a workpiece properly centered relative to a honing tool by automatically balancing the lateral forces tending to shift the position of the workpiece. FIG. 8 shows a worktable 100 having a pair of vertical support posts 102 with adjustable racks 104*a*, 104*b*, each supporting a corresponding one of a pair of work holding apparatus 10. The two work holders 10*a*, 10*b* are supported on the racks in vertical alignment, one above the other, and fixed against rotation. A workpiece 106 is shown mounted within the work holders 10*a*, 10*b*. A hone 108 is shown in position within the workpiece 106, affixed to a shaft 110 which is supported and driven by a drive assembly (not shown) coupled to the shaft 110 through a support arm 112.

The two work holders 10*a*, 10*b* are oriented at 180°, relative to each other, about the workpiece 106. That is, the projection 26*a* of holder 10*a* (see FIG. 1) extends to the right, for example, while the projection 26*b* of holder 10*b* extends to the left. With the work holders 10*a*, 10*b* oriented in this manner, the anchored ends 40 of the respective coil springs are also located at 180° from each other. Thus the lateral forces generated by the torques applied by the respective spring coils are applied to the workpiece 106 in opposite directions, thereby cancelling out and leaving the workpiece 106 centered with respect to the hone 108. Accordingly, the honing implement is enabled to hone the workpiece 106 evenly about the interior surface.

Although there have been described hereinabove various specific arrangements of a work-holding apparatus and method in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A method of forming an adaptor fitting around a workpiece so that it can be held in a work-holding apparatus, comprising the steps of:
   (a) coating an outer portion of said workpiece with a parting agent;
   (b) applying an adhesive layer over said parting agent;
   (c) impregnating said adhesive layer with an abrasive grit;
   (d) placing said workpiece in an annular mold;
   (e) pouring a molding material between an inner periphery of said annular mold and an outer periphery of said workpiece;
   (f) allowing said molding material to harden; and
   (g) removing said workpiece and molding material from said mold.

2. The method of claim 1 wherein said molding material is a hard polyurethane plastic.

3. The method of claim 1 wherein step (c) is accomplished using a sandblast gun.

4. The method of using an adaptor to hold a workpiece in a work-holding apparatus, said adaptor having been formed by the steps of:
   (a) coating an outer portion of said workpiece with a parting agent;

(b) applying an adhesive layer over said parting agent;

(c) impregnating said adhesive layer with an abrasive grit;

(d) placing said workpiece in an annular mold;

(e) pouring a molding material between an inner periphery of said annular mold and an outer periphery of said workpiece;

(f) allowing said molding material to harden; and (g) removing said workpiece and molding material from said mold; said method of using comprising:

gripping the thus formed adaptor in said work-holding apparatus having a multi-turn spring band coil anchored at an outer terminal end thereof; and tightening said coil about the outer periphery of said adaptor.

* * * * *